United States Patent [19]

Blomberg et al.

[11] Patent Number: 4,636,011
[45] Date of Patent: Jan. 13, 1987

[54] BRAKING FORCE MODULATOR

[76] Inventors: Folke I. Blomberg, Duvstigen 4, S-181 40 Lindingo; Jan-Olov M. Holst, Skogsduvevagen 14, S-752 52 Uppsala, both of Sweden

[21] Appl. No.: 666,649
[22] Filed: Oct. 31, 1984

[30] Foreign Application Priority Data

Oct. 31, 1983 [SE] Sweden ................. 8305977

[51] Int. Cl.⁴ .............................................. B60T 8/40
[52] U.S. Cl. .................................... 303/115; 303/116
[58] Field of Search ............... 303/113, 114, 115, 116, 303/117, 118, 119, 94, 100; 361/154; 417/199 R; 92/491; 188/181 R, 181 A

[56] References Cited

U.S. PATENT DOCUMENTS

| | | | |
|---|---|---|---|
| 3,022,114 | 2/1962 | Sampietro | 303/DIG. 4 |
| 3,356,910 | 12/1967 | Bushwell | 361/154 |
| 3,582,718 | 6/1971 | Spellman | 361/154 |
| 3,729,235 | 4/1973 | Bach et al. | 303/114 |
| 3,866,981 | 2/1975 | Klatt | 303/100 |
| 3,877,756 | 4/1975 | Inada et al. | 303/114 |
| 4,053,187 | 10/1977 | Cook | 303/117 |
| 4,132,154 | 1/1979 | Nishiba | 91/491 |
| 4,166,657 | 9/1979 | Blomberg et al. | 303/119 |
| 4,215,902 | 8/1980 | Sato et al. | 303/119 |

Primary Examiner—Douglas C. Butler
Assistant Examiner—Alvin Oberley
Attorney, Agent, or Firm—Daniel E. McConnell

[57] ABSTRACT

The present invention relates to a braking force modulator for an anti-lock system for pneumatic brakes for vehicles in which a hydraulic circuit accomplishes the anti-lock function. A sensor sensing the state of rotation of a wheel emit signals for controlling a modulator valve (34) which, in response to such signals modulates the pressure in one or more counter-pressure cylinders (27). A closing valve is inserted into the pressurized-air conduit (4) between the control valve (5) for the brake operated by the driver and one or more braking cylinders (8) and this closing valve closes the pressurized-air supply to the braking cylinder or cylinders (8) subsequent to a sensor signal ordering release of the brakes. A release valve is inserted into the pressurized-air conduit (4) between the closing valve and the braking cylinder or cylinders (8) for discharging pressurized air therefrom if the ability of the pressure producer (13, 26) for the hydraulic fluid pressure and of the counter-pressure cylinder (27) to continue the release of the brake is exceeded.

16 Claims, 11 Drawing Figures

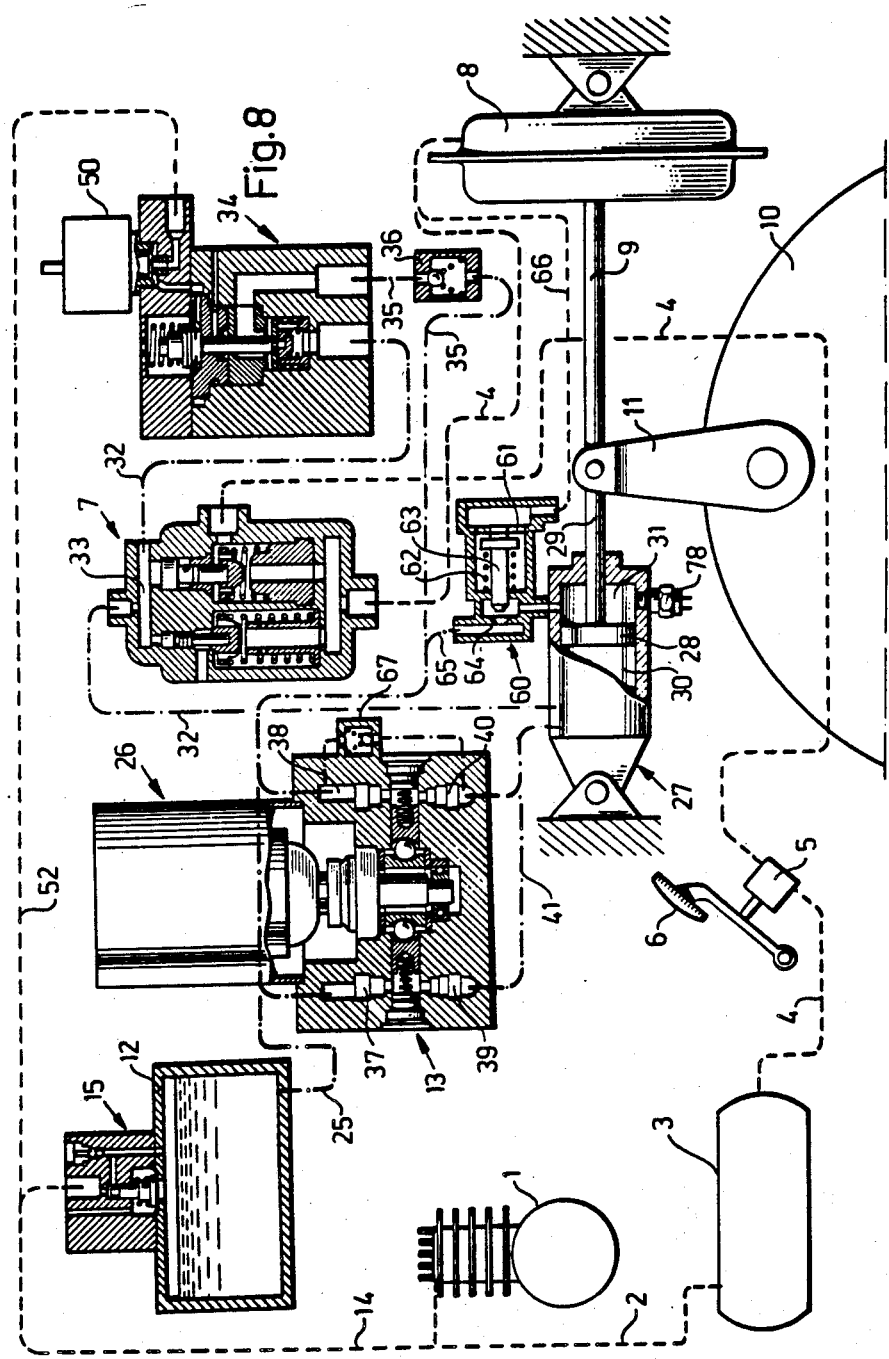

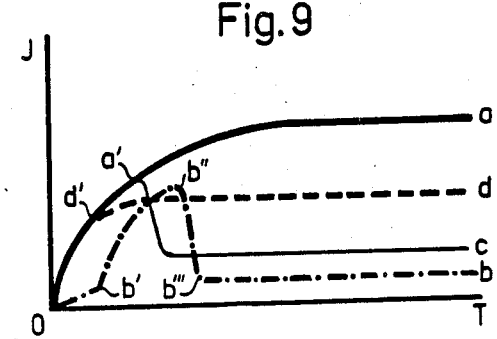
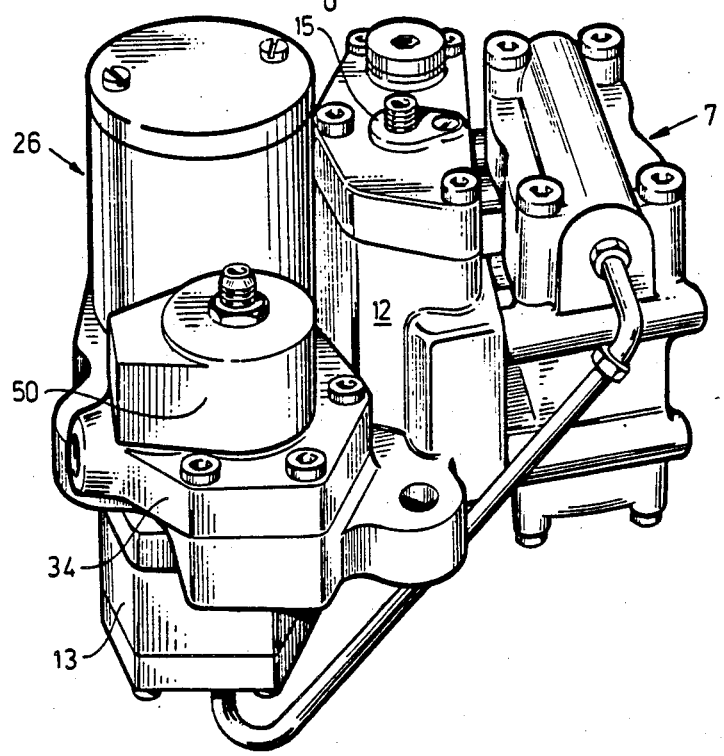

BRAKING FORCE MODULATOR

FIELD AND BACKGROUND OF INVENTION

The present invention relates to a pneumatic braking system braking force modulator. The modulator, when coupled with suitable devices for sensing the state of rotation of the wheels of a vehicle, forms a complete system for preventing wheels from becoming locked when brake forces are applied which exceed the limit corresponding to the actual state of friction existing at a certain moment between the wheels and the road surface.

In such complete so-called "anti-lock" or "anti-skid" systems the basic function is such that when the sensor monitoring the state of the rotation of the vehicle wheel during braking detects that the wheel tends to be retarded beyond a certain limit, the system signals the braking force modulator to prevent additional accumulation of braking force and possibly also to reduce already applied braking force. The retardation of the vehicle wheel is thus reduced and transformed into an acceleration. When the vehicle wheel has reached a speed approaching the speed of a non-braked wheel at the actual vehicle speed, the system responsive to the wheel sensor may signal the braking force modulator to increase the braking force or to hold it on a constant level.

As the present invention only refers to a braking force modulator, there is no reason here to deal in detail with wheel sensors which are available in many well-known constructions, both mechanical and electronic, representing various control philosophies. Some of these sensors produce only two orders, viz. (1) to prevent additional braking force accumulation and reduce already applied braking force or (2) to increase the braking force. As previously intimated, sensors are available which in addition to the above-mentioned two orders also produce a third order to hold the braking force at a constant level.

It appears from the above explanations that a universally useful braking force modulator, that is a modulator which may be used in combination with any type of wheel sensor known so far, must fulfill a requirement to be able to receive and execute four orders, namely:
1. Bar additional accumulation of braking force.
2. Reduce already applied braking force.
3. Increase braking force.
4. Hold braking force at a constant level.

Preferably each wheel provided with a brake, which may be a driven wheel on a pulling vehicle or a freely rotating wheel on an attached trailing vehicle, forms a unit with a sensor and other equipment for preventing locking of the brake. For purposes of simplifying and clarifying the following discussion, this invention will hereinafter be described by reference to a single wheel provided with a brake. However, the expert in the applicable field will realize that other embodiments are possible. For example an embodiment may be mentioned in which the braking force on all brakes on a common shaft are controlled identically by a common system.

Lock-preventing systems for pneumatic brakes for vehicles are known in which the sensor signals actuate various valve arrangements such that the compressed air used for brake application proper is discharged completely or partly whenever a sensor signal ordering the braking force to be reduced is produced. Thus, this means that whenever the lock-preventing system comes into action, compressed air is released into the environment. During a braking process controlled by such a system, a series of such air discharges occurs in alternation with supply of air from the compressor or air-supply tank of the vehicle. The compressor is required incessantly to provide compensation for these pressure releases and, when the pressure releases are numerous and large during a comparatively short time, the compressor will not be able to supply the necessary air flow.

Thus the operation of such a system involves large consumption of compressed air and during repeated powerful braking on a slippery support this may cause the pressure of the pneumatic system to fall below the level at which the emergency or parking brakes will be actuated.

As air is compressible, there are always certain time lags required to build up or release pressure. The amount of available pressurized air is determined by the compressor and the tank, and it is not permissible, either economically or in respect to space, to dimension this equipment to supply the demands which may be made on some isolated occasions. Discharge and replenishment may be accelerated by increasing valve areas, which yields other problems such as bad sealing, long operation times, control difficulties and the like. In practice, lesser valve areas are still preferred and attempts at acceptable function with reasonable consumption of pressurized air are made by limiting the working frequency of the system.

Due to the problems discussed in the preceding paragraph such a conventional anti-lock system for pneumatic brakes functions slowly, often at a frequency between 1 and 2 Hz for the control cycles, while at the same time the consumption of pressurized air is so large that the pressure thereof after 10 to 15 seconds has fallen below a useful value. The driver experiences the braking as jerky and it is not unusual that the driver is forced to compensate for braking variations in the two forward wheels by virtually steering against braking action which gives neither the impression nor the effect of a fully reliable braking system. In many vehicles this renders individual control of the forward wheel brakes impossible.

U.S. Pat. No. 4,166,657 discloses a device for preventing pneumatically braked vehicle wheels from locking during braking. The basic principle of the system disclosed is that upon receipt of a sensor signal a counterforce is applied to a mechanical link in the braking system for reducing the braking force. The counterforce is provided by a hydraulic system comprising a tank for hydraulic fluid, a hydraulic pump driven by an electric motor, a valve which is normally open but which is closed upon application of a sensor signal, and a hydraulic cylinder which is continuously connected to the mechanical system actuating the brakes and thus moves every time braking is performed. The cylinder action causes hydraulic fluid to be pressed from the cylinder into the hydraulic fluid tank when the brakes are applied and sucked back from the hydraulic fluid tank into the hydraulic cylinder when the brake is released. The valve controlled by the sensor signal is inserted into the conduit to the hydraulic cylinder and is open during normal braking so that the system does not produce any opposing forces during normal movements of the braking mechanism. When during a brake application the sensor emits a closing signal to the valve, hydraulic fluid flow from hydraulic cylinder to the hydraulic fluid tank is interrupted and brake application is blocked. If, in addition, the sensor emits an order to start the electric motor driving the hydraulic pump, hydraulic fluid is pumped from the hydraulic fluid pump to the hydraulic cylinder causing the brake to be released due to the fact that the force from the hydraulic cylinder overcomes the force from those elements in the conventional braking system which operate the brake. If the motor is stopped and the valve is opened the brake is again applied. It will be appreciated that by causing the sensor to emit various combinations of signals to the valve and the motor, the device according to U.S. Pat. No. 4,166,657 can be caused to perform all the four functions mentioned above.

While this prior art device is satisfactory in many cases, it has shown that very strong electric motors will be needed to drive the hydraulic pump in heavy vehicle applications where the braking forces are considerable. Energy required to start a pumping motor often exceed 1 kW and a mean effect of 350 W may be required during a braking process controlled by the system. Such modulators and the associated driving motors are large, clumsy and expensive in addition to consuming excessive power.

Studies of test results obtained from heavy vehicles provided with pneumatic brakes and anti-lock systems in which pressurized air is released have shown that variations in the pressure of the pressurized air during modulated braking practically never are greater than about 2 bar, independently of the state of the road and the weight of the vehicle. A pressurized air system for vehicles normally holds a pressure of about 7 bar during braking and the pressure variations during modulated braking may be between 7 and 5 bar when the road is good and the vehicle is fully loaded. Depending on the state of the road and the weight of the vehicle the range of values will drop to 2 to 1.5 bar or lower when the friction ratio between the vehicle wheel and the road surface is particularly low. However, under any conditions the difference between the higher and lower pressures in the range will be about 1.5 to 2 bar, and only in rare cases will it be higher.

BRIEF DESCRIPTION OF INVENTION

It is an object of the present invention to reduce the power required to properly operate a braking force modulator of the general type described. In realizing this object of the present invention, the invention makes use of the conditions explained in the preceding paragraph by responding to sensor signals, under certain conditions, by on the one hand interrupting the increase in braking force in the conventional braking system and on the other hand releasing braking force already applied. Thus the braking force modulator is not required at anytime to produce counterforces corresponding to the maximum brake application forces that the conventional braking system can produce.

A further object of this invention is to improve upon the modulator device of prior U.S. Pat. No. 4,166,657 in such a manner as to realize the purposes intimated in the preceding paragraph. In accordance with this object of the present invention, the improved device comprises a unit which is inserted into the pressurized-air conduit between a braking cylinder and the valve in the conventional braking system by which the driver applies air pressure to the braking cylinders. When the braking force modulator is inactive, the unit provides a fully open duct for air. The unit contains two valves, both operated by spring-biased pistons which in turn are operated by the hydraulic fluid pressure existing in the hydraulic cylinder of the braking force modulator. One valve is a closing valve which at a certain relatively low hydraulic fluid pressure interrupts the pressurized-air supply to the braking cylinder. The other valve is a release valve which at a certain considerably higher hydraulic fluid pressure releases air from the braking cylinder to the atmosphere. If during braking the vehicle wheel is retarded in a way causing the sensor to emit a signal ordering brake release, the braking force modulator comes into action and produces a hydraulic fluid pressure in its hydraulic cylinder. As soon as this pressure rises to a predetermined amount e.g. 4 to 7 bar, the closing valve of the unit is closed and continued pressure accumulation in the braking cylinder is stopped. The braking force modulator continues to increase the hydraulic fluid pressure in the hydraulic cylinder, permitting the brake release to continue. In most cases the braking force modulator thereafter is able to control the continued braking course, which means that it is able to release the brake in a sufficient degree against the air pressure isolated in the braking cylinder. If the hydraulic pressure should increase to a value near the maximum value for which the pump of the braking force modulator is adapted, e.g. 80 bar, the release valve of the unit is opened and releases a part of the air confined in the braking cylinder. In this way, a single limited release of air will normally permit braking to be controlled by a braking force modulator having a considerably less powerful electric motor and pump than those required in a device according to U.S. Pat. No. 4,166,657. It has been found that a motor having a starting effect of about 350 W is sufficient and that a braking force modulator according to the present invention only requires a mean effect of barely 100 W.

Even with the very low power requirement, it has been possible for the braking force modulator according to this invention to perform at a higher working frequency and thereby higher efficiency than any previously known braking force modulator for pressurized-air brakes.

Other basic features and advantages of the invention will appear from the following description, the invention itself and its particular characteristic features appearing from the attached claims.

BRIEF DESCRIPTION OF DRAWINGS

Some of the objects of the invention having been stated, other objects will appear as the description proceeds, when taken in connection with the accompanying drawings, in which:

FIG. 8 is a schematic representation of a modified form of the lock preventing device of FIG. 1 having provision for eliminating exaggerated release of the brake;

FIG. 9 is an amperage-time diagram for solenoid operating circuits;

FIG. 10 is a perspective view of a practical embodiment of the invention, and

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
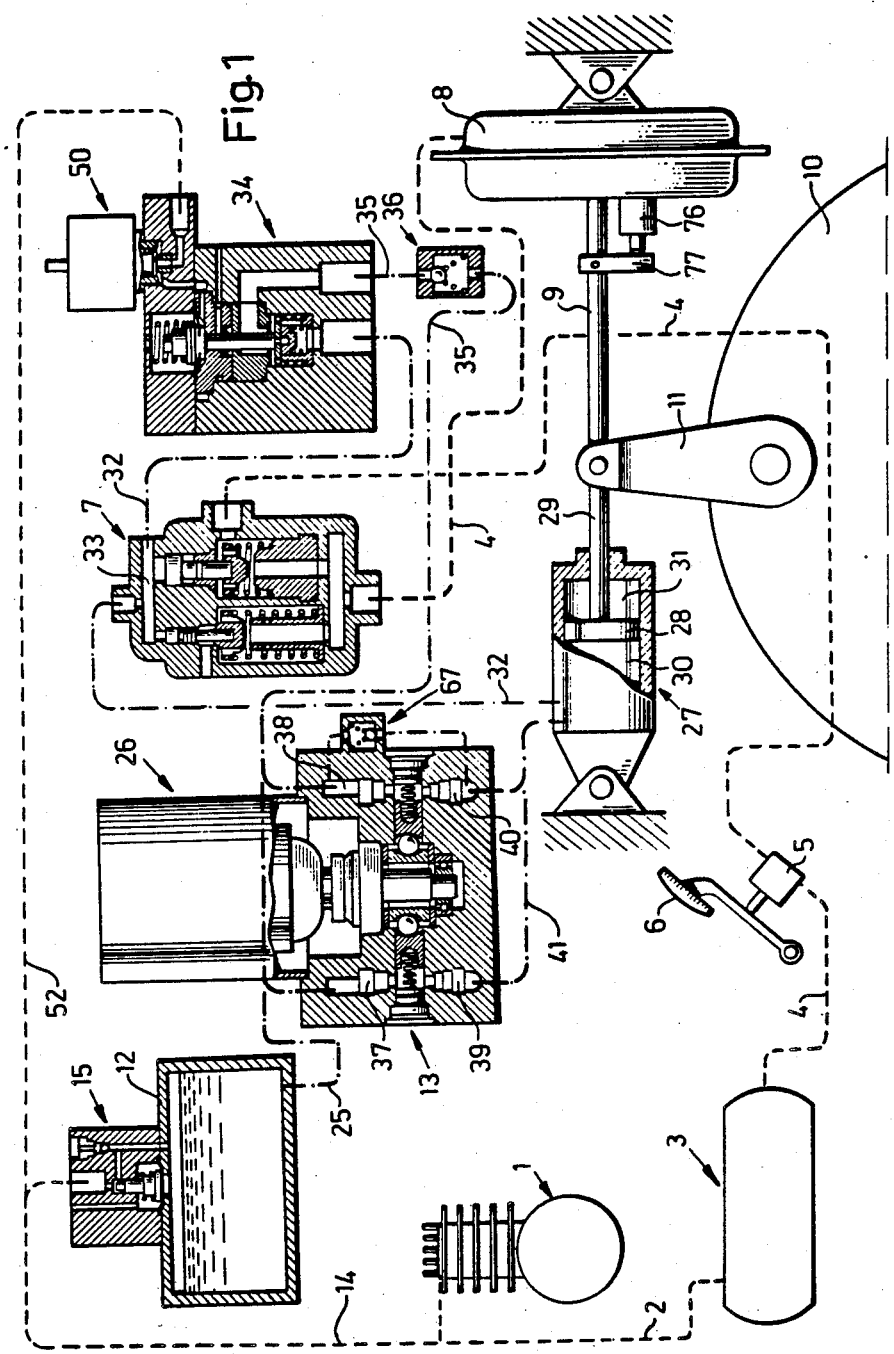
FIG. 1 is a schematic representation of the braking force modulator according to the invention together with a complete braking system for a wheel with the various parts shown completely or partly in section.
Figure 2:
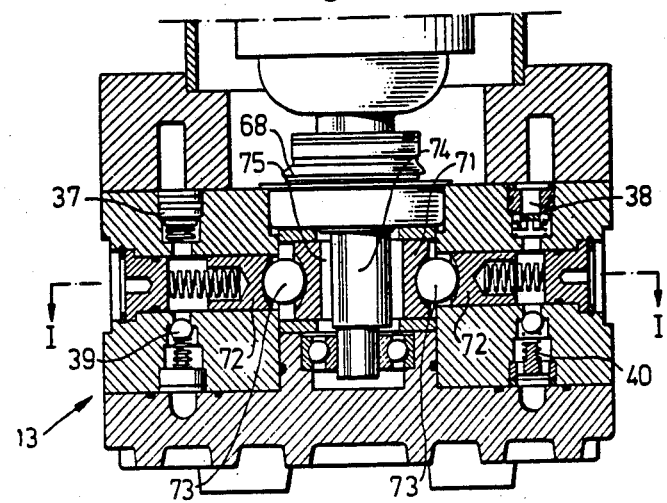
FIGS. 2 and 3 are sections of a piston pump forming part of the system according to FIG. 1.
Figure 3:
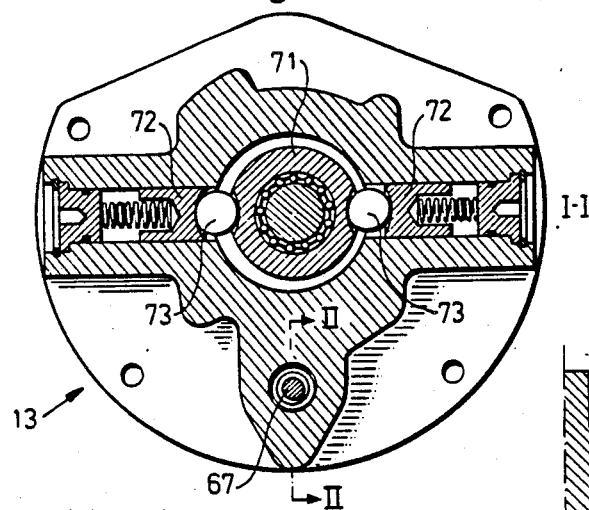

The embodiment of the device according to this invention as shown in FIG. 1 comprises, on the one hand, a conventional pressurized-air system and, on the other hand, a hydraulic system. In FIGS. 1 and 10 the pressurized-air conduits are drawn as broken lines and the hydraulic conduits as dot-and-dash lines. The pressurized-air system comprises a compressor 1 connected by a conduit 2 to a pressure tank 3 for pressurized air used for both the brakes of the vehicle and for operating a servo valve forming part of the braking force modulator. The air system further has a conduit 4 which is connected to a brake valve 5 responsive to a brake pedal 6, adapted to be operated by the driver, and which extends to a control valve 7 and from there to a braking cylinder 8. The braking cylinder 8 is of conventional construction and comprises a membrane (not shown) from which a pressure rod 9 movably extends outwardly through a wall of the cylinder 8 to the brake 10 proper through a brake lever 11 connected to a wheel. When pressurized air is supplied to the braking cylinder 8, rod 9 will be urged to the left in FIG. 1 and the brake is applied. When pressurized air is released, the pressure rod 9 is returned towards or to its starting position with the aid of springs or the like (not shown).

Figure 6:
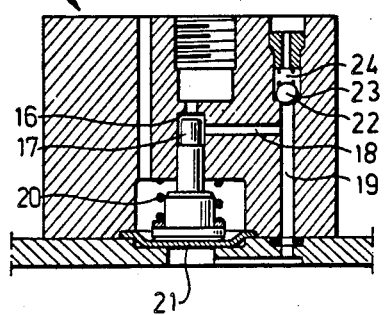
FIG. 6 is a section of a pressure holding valve forming part of the system according to FIG. 1.

The braking force modulating system of the invention comprises a tank 12 for the hydraulic fluid in which the hydraulic fluid and thereby the entire hydraulic system is under a pressure of between 1 and 3 bar. The hydraulic system is pressurized for two purposes. On the one hand, the operation of the pump 13 (shown as a substantially conventional two-cylinder piston pump, details of which will be explained later on) will become more efficient and reliable due to the fact that cavitation at its inlet valves will be avoided and, on the other hand, the applied pressure guarantees the ventilation of the system in a way which also will be described later on. This application of pressure is obtained by means of a pressurized-air conduit 14 which supplies air to the tank 12 through a reducing valve 15 combined with a security check valve. In FIGS. 1 and 6 the device is shown with the various parts in their positions taken prior to pressure application to the tank 12. When pressurized air is supplied through conduit 14, the pressurized air passes the valve seat 16 and cone 17 via ducts 18 and 19 down into tank 12. When the pressure therein has increased to a predetermined value, the bias of spring 20 is overcome by the force exerted by membrane 21 causing the valve cone 17 to move upwardly towards the valve seat 16 and the accumulation of pressure in tank 12 to cease. As one can never be sure that an absolutely tight seal is obtained between valve cone 17 and seat 16, the pressure holding device 15 has been provided with a conventional security valve comprising a valve seat 22 integrated into the housing of device 15, a ball valve 23 and a spring 24. The adjustment of this security valve thus finally determines the application of pressure in tank 12.

From tank 12, a hydraulic conduit 25 extends to a pump 13 which is driven by an electric motor 26, and therefrom further to a relief cylinder 27 in which a piston 28 provided with a pressure rod 29 is adapted to be shifted. Piston 28 subdivides the interior of the cylinder 27 into two chambers 30, 31, one of which (the chamber 30) may be pressurized to counteract the braking force brought to bear by the braking cylinder 8. The other (chamber 31) is ventilated to the atmosphere.

From the pressurized chamber 30 in the relief cylinder 27 a hydraulic conduit 32 extends to a collecting chamber 33 in the control valve 7 and from there to a pneumatically servo-controlled modulator valve 34 and further back to the hydraulic fluid tank 12 through a conduit 35. A check valve 36 is inserted into the last mentioned conduit 35 between the modulator valve 34 and tank 12. Its purpose is to render the system self-ventilating, this purpose being achieved in two ways.

If there is no hydraulic fluid in the system, for example when it has just been mounted on a vehicle and tank 12 filled with hydraulic fluid, the fluid, provided that the pump is placed below tank 12, will flow downwardly by gravity through conduit 25 to the inlet valves 37 and 38 of pump 13. However, the pump will not operate when the motor 26 is started due to the fact that air is trapped in the cylinders. Pumps of this type having small stroke volumes and necessarily relatively large dead volumes are not self-ventilating. When pressure is applied to tank 12 by means of pressure holding valve 15, the check valve 36 blocks the pressure from reaching the modulator valve 34 from tank 12 through conduit 35 and passing further through conduit 32 and control valve 7 to chamber 30 and from there to the outlet valve 39, 40 of pump 13. On the contrary, hydraulic fluid is pressed from tank 12 through the inlet and outlet valves 37, 38, 39, 40 of pump 13 and through conduit 41 into chamber 30 until the pressure determined by pressure holding valve 15 is prevailing in the whole system. Thereby the pump 13 will be efficiently ventilated as will the chamber 30, at least in part, depending on the volume of conduit 35, the collecting chamber 33 in the control valve 7 and the space within modulator valve 34. At any case, pump 13 is now ready to pump if the system will be activated and the small amount of air that may be trapped in the chamber 30 would only cause a certain retardation of the first and possibly one or two additional control cycles, whereafter the entire system is ventilated. This means that pump 13 will be ventilated also if it is provided above tank 12.

However, check valve 36 has another ventilating function. Studying the conduit arrangement in connection with tank 12; the inlet and outlet valves 37, 38, 39, 40 of pump 13; check valve 36; and chamber 30; it will be appreciated that a closed circuit is at hand in which cylinder 27 with chamber 30 and piston 28 forms a pump with the inlet and outlet valves 37, 38, 39, 40 of pump 13 as inlet valve, and the check valve 36 as outlet valve. Piston 28 is shifted during every normal braking action which means that hydraulic fluid during every braking moves in a circuit which will maintain the entire system ventilated.

The conventional portion of the pressurized-air braking system shown in FIGS. 1 and 8 operates in the following way: When the driver depresses the brake pedal 6, the control valve 5 is opened and pressurized air flows from pressurized-air tank 3 through control valve 7 to braking cylinder 8 via pressurized-air conduit 4. Pressure rod 9 is moved outwardly and turns level 11 on brake 10 causing the brake to be applied. In a conventional pressurized-air braking system the pressure of the pressurized air amounts to about 7 bar.

A sensor (not shown) senses the rate of rotation of the braked wheel. If the braking becomes so powerful that the wheel is retarded to a value exceeding a predetermined value, i.e if the braking force will be greater than that permitted by the friction against the road surface and if the wheel thus tends to get locked, the sensor emits a signal which, on the one hand, causes the motor 26 of pump 13 to start and, on the other hand, causes the modulator valve 34 to block a closed loop hydraulic fluid flow produced by pump 13.

Modulator valve 34 (FIG. 5) comprises a pair of valve members 42, 43 with respective return springs 44, 45 which normally are open. They are operated with the aid of a membrane 46 and a balancing spring 47 acting through a push rod 48 having a pin 49 which extends through a valve disc 42 for operating a valve ball 43. The space underlying the membrane 46 is normally open to the atmosphere by solenoid valve 50 comprising a core 51 which at each end forms the movable part or two valves. Upon receipt of a sensor signal ordering the brake to be released, current is supplied to motor 26 and solenoid valve 50 causing core 51 to be lifted and to open the lower one of the valve openings and close the upper one. Thereby the connection between the membrane chamber and the atmosphere is interrupted and pressurized air is supplied thereto through conduit 52.

Figure 5:
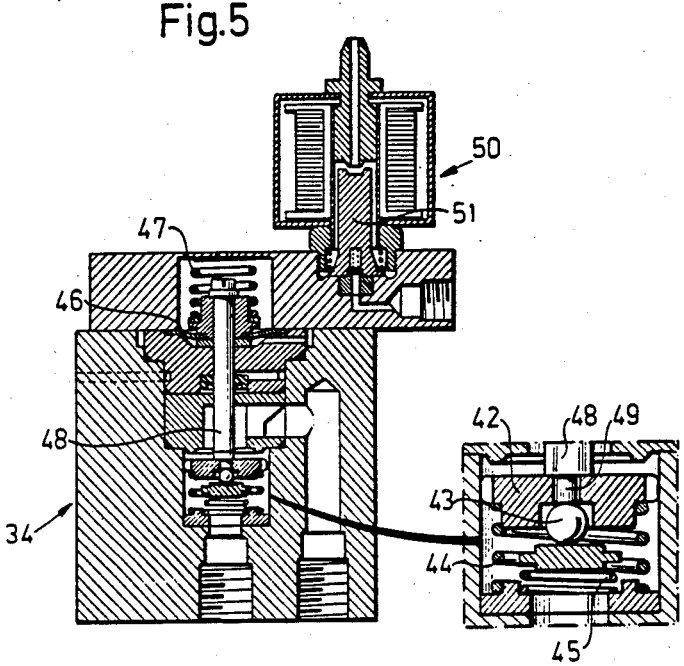
FIG. 5 is a section of a servo valve forming part of the system according to FIG. 1.

Push rod 48 is then moved in an upward direction as shown in FIG. 5, causing at first valve 42 to close and immediately thereafter all the ball valve 43. If now motor 26 and thereby pump 13 are started, a brake release is started due to the fact that pump 13 starts accumulating a hydraulic pressure in chamber 30 of the relief cylinder 27.

Upon receipt of a sensor signal indicating that the brake should again be applied, the current supply to motor 26 is interrupted causing pump 13 to stop. Also current supply to solenoid 50 is interrupted causing core 51 to move again towards its lower position to restore the connection of the membrane chamber with the atmosphere and to interrupt the pressurized-air connection with conduit 52. Membrane 46 and push rod 48 move downwardly under the action of spring 47, and ball valve 43 is opened. However, the force exerted by spring 47 is selected to be insufficient to open the big valve 42 due to the high hydraulic pressure accumulated during brake release. Thus the application of the brake is performed in a soft, controlled way which is essential in order to cause the system to operate in a jerk-free way. The speed of application may be adapted by suitable choice of the diameter of the hole in valve 42 and the diameter of pin 49 passing through this hole for operating the ball valve 43.

In order to cause the big valve to open, the hydraulic pressure is required to go down to some few bar, which normally never occurs during a braking course controlled by the system unless the driver concludes the braking by releasing the brake pedal. Thus, during a braking course controlled by the system as a rule only the ball valve 43 will be opened and closed.

It should be noted that the sensor system so far referred-to is a simple system only emitting signals ordering the brake to be released and applied respectively. Such sensor systems are described in e.g. U.S. Pat. Nos. 4,225,018; 4,225,019; and 4,235,316. However, sensor systems are available which in addition to the two signals mentioned above also emit signals causing the braking force to be held at a constant level during certain periods. The braking force modulator according to this invention is able also to receive and obey such orders. This is brought about by operating motor 26 and solenoid valve 50 by mutually independent sensor signals. The sensor order to hold the braking force at a constant level is obeyed by interrupting current supply to motor 26 whereas solenoid valves 50 is supplied with current.

In the following detailed description of the function of the system, the explanation will however be restricted only to deal with sensor systems emitting the orders to respectively release and apply the brake.

Figure 11:
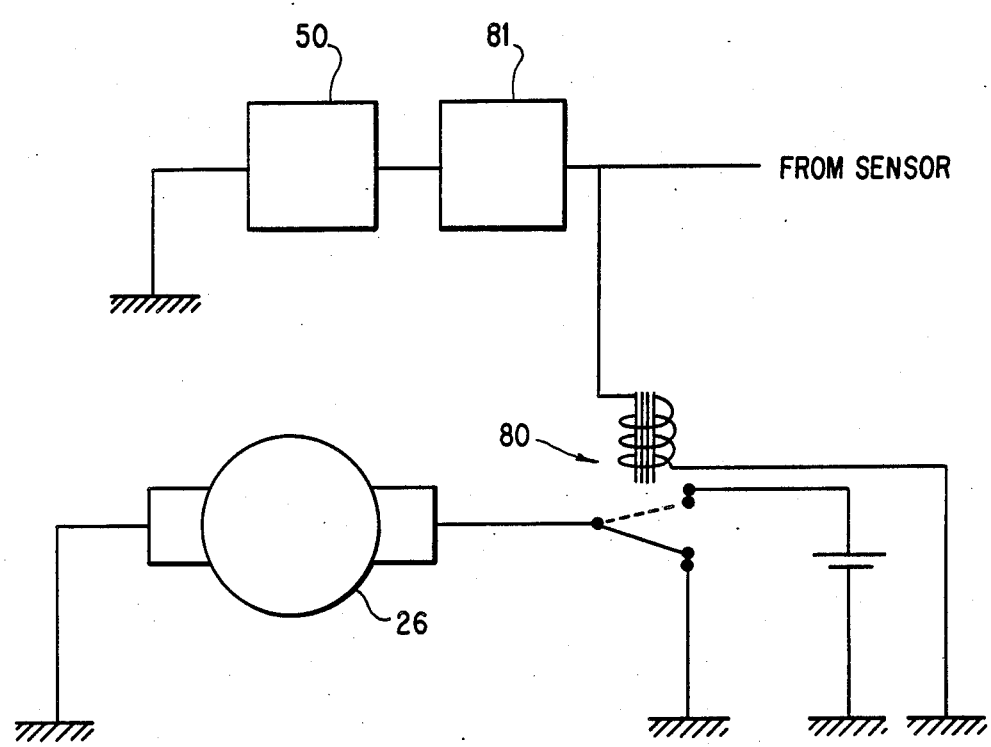
FIG. 11 is a schematic representation of certain electrical circuit elements useful in the apparatus of this invention.

It may also be mentioned that the working frequency of the system and thereby its efficiency may be increased by constructing the control means which supplies current to motor 26 in such a way that the motor is short-circuited when current supply is interrupted. Such an arrangement is illustrated in FIG. 11 where a relay 80 is connected with the modulator 26 to accomplish such a function. After an interruption of the current supply the motor will thus operate as a short-circuited generator producing a very powerful braking moment which quickly brings motor 26 and thereby also pump 13 to a standstill. This technique is well-known in itself and often used in various control systems and other devices. The abrupt stopping of windshield wipers when they approach rest position after interruption of current supply is brought about in this way.

If the sensor emits a signal indicating that the wheel is being retarded too strongly, valves 42 and 43 of the modulator valve 34 will be closed while at the same time pump 13 starts pumping hydraulic fluid into chamber 30 in relief cylinder 27. The pressure accumulated in this cylinder acts on the piston 28, and when this pressure has become sufficiently high, the piston 28 is moved toward braking cylinder 8 and the braking force is reduced. The sensor continually monitors the state of rotation of the braked wheel and, depending on the sensed state, emits signals which open and close valve 43 and start and stop motor 26 and thereby pump 13. It has been found that a suitable pressure of the hydraulic fluid from the pump amounts to about 80 bar even if the pump may be able to produce a higher pressure. It has been found that the motor suitably should be dimensioned for a starting effect of 350 W. When the motor has started the power requirement goes down to about half this value and, as during a braking course controlled by the system the periods of brake release and brake application are approximately equally long, the average power consumption will be of the order of 100 W. This applies to very powerful brakes, e.g. rear brakes on a very heavy truck. For the forward wheels of the same truck, the power requirement is only about half this value.

Figure 7:
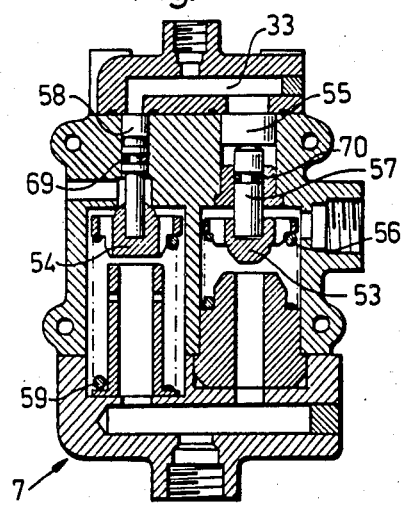
FIG. 7 is a section of a hydraulically operated combined closing and release valve for pressurized air as used in the system according to FIG. 1.

In accordance with an important feature of this invention, the hydraulic fluid pressure in chamber 30 in the relief cylinder 27 is transmitted through conduit 32 to the collecting chamber 33 in control valve 7 where it acts on two pistons controlling two valves, which in turn control the air pressure in cylinder 8 during a braking course controlled by the system comprising the wheel sensor and the braking force modulator. One of these valves is a closing valve 53 (compare FIG. 7) which interrupts the supply of pressurized air to braking cylinder 8 through conduit 4 when the pressure in collecting chamber 33 exceeds a predetermined value between 4 and 7 bar. This means that the continued control of the braking force is dominated by the braking force modulator as long as the hydraulic pressure in chamber 33 is above the adjusted value of 4 to 7 bar for the closing valve 53.

If the pressure in chamber 30 rises above a predetermined higher value, e.g. about 80 bar, i.e. the value pump 13 is intended to produce, a release valve 54 in control valve 7 opens to cause pressurized air to be released from braking cylinder 8 through an opening 8 in the housing of control valve 7.

The two valves 53, 54 (FIG. 7) are thus operated by the hydraulic pressure accumulated in the collecting chamber 33. The pressure at which the closing valve 53 is to close is determined by the interrelation between the area of a piston 55 and the biasing force of an associated spring 56. The force from the piston 55 is transferred to the valve 53 by a push rod 57. Analogously, the pressure at which the air releasing valve 54 in intended to open is determined by the interrelation between the area of a piston 58 and the bias of an associated spring 59.

It is to be noted that the operation of the two valves 53, 54 is also influenced to a certain extent by the pressures prevailing in pressurized tank 12, the atmospheric pressure, and the air pressure prevailing in the valve cavity in control valve 7. As will be described in greater detail later on, the space on the side opposite to the side on which hydraulic pressure acts on the pistons 55, 58 is drained into tank 12 in which the pressure is adjusted to between 1 and 3 bar. As far as piston 58 is concerned, it will be appreciated that this plays no part because this pressure is completely balanced and does not exert any force on the piston. In distinction, the force exerted on the closing valve 53 is influenced by a force corresponding to the force exerted by the hydraulic pressure on the associated piston 55.

This force is exerted by the pressure in tank 12 onto the surface forming the difference between the cross-sectional areas of piston 55 and push rod 57. Moreover push rod 57 is acted upon by the air pressure prevailing in control valve 7 in the direction against the force exerted by the hydraulic pressure on piston 55. It will also be appreciated that when the valves 53, 54 are closed, air pressure differentials thereover exert a force tending to hold them closed, whereby certain hysteresis differences are produced in the hydraulic pressure at which the valves are opened and closed.

The influences of various air pressures as described in the preceding paragraph, however, are of minor importance, on the one hand, because the air pressures are low compared to the hydraulic pressures and, on the other hand, because no difficulties are encountered in so balancing the mutual interrelation between the relevant cross-sectional areas and the springs 56, 59 in such a way that the action of the air pressure forces on the function of control valve 7 will become completely unimportant.

Thus, the control valve 7 accomplishes a balancing of the pressure in the hydraulic and pressurized air systems so that pump 13 never need work against the maximum pressure which the pressurized air system is able to offer, but only need work against the maximum pressure which control valve 7 is adjusted to permit and which still is sufficient under all conditions to yield maximum braking effect without locking of the wheels. As the control portion proper of the braking system is operated with hydraulic fluid, all pressure transmission is performed practically instantaneously and the system may operate at a relative high frequency up to above 7–8 Hz. Due to operation in such frequency ranges, the braking effect in practice gives an impression of being even and powerful without any tendency towards lateral bias in the steerable wheels of a vehicle equipped with the system of this invention.

During a controlled braking process a discharge of air normally only occurs in the beginning of the process. All subsequent adaptation of the braking force is performed only by the hydraulic system, provided only that the condition of the road is substantially constant. If the road condition changes during a braking process controlled by the wheel sensor/braking force modulator system of this invention, it may however happen that due to suddenly deteriorated road condition another discharge of air occurs or, if the road condition suddenly becomes improved, an increase of the braking force may require supply of additional air from the pressure supply tank of the braking system, which occurs if the hydraulic pressure goes down below the pressure between 4 and 7 bar above which the closing valve 53 closes.

Normally considerable lost-motion occurs during application of a pressurized-air brake, which means that the piston rod 9 must move over a rather long distance before the brake shoes come into contact with the brake drum. Ordinary values for drum brakes for trucks are a total stroke length of the piston rod 9 of above 50 mm, of which 40 mm are lost-motion and only 10 mm constitute the distance over which the piston rod moves from the moment of the first contact of the brake shoes with the drum to the point of full brake application. This condition may be to the disadvantage of the efficiency of the system under certain conditions. For example, during a very abrupt brake application under very slippery road conditions it could happen that the wheel is forced down to such a low speed in relation to the speed of the vehicle that it takes a long time for the wheel to recover enough rotational speed that the sensor signal to release the brake will cease. The modulator then may have operated so long that not only has it completely released the brakes but also forced back the brake far out into the lost-motion range. When the sensor subsequently orders the brakes again to be applied, this lost-motion must be taken up before the brakes again start operating. This obviously means a loss of time lowering the working frequency of the system and thereby its efficiency.

In many applications it may be accepted that the modulator releases the brake out into the lost-motion range, but for certain vehicles it is essential that this drawback is eliminated. For this purpose a holding valve 60 is introduced into the modified system shown in FIG. 8, which is in all other respects identical with that illustrated in FIG. 1. The holding valve 60 comprises a closing valve inserted between chamber 31 in cylinder 27 and hydraulic conduits 65, 35, 25 connected to tank 12. The valve is operated via pneumatic conduit 66 by the same air pressure as that supplied to the braking cylinder 8 during braking. The operating means consists of a membrane 61 and a return spring 62.

Figure 4:
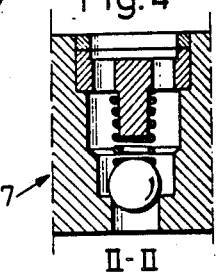
FIG. 4 is a section of an overflow valve forming part of the piston pump according to FIGS. 2 and 3.

During very extreme conditions, for example, when a vehicle with strongly applied brakes moves on a road in good condition and suddenly passes onto a road section in very bad condition, the speed of rotation of a wheel may quickly go down to almost a standstill. The wheel sensor will then emit a signal to the modulator ordering it to release the brake. However, due to the low friction between wheel and road surface, the speed of rotation of the wheel even with fully released brakes will increase so slowly that the wheel sensor signals will continue for such a time that the modulator will not only succeed in releasing the brakes out into the lost-motion range, but up to the mechanical final stop. Considering a wheel with a brake, wheel sensor and modulator, it will be found that the hydraulic pressure in the control valve 7 is so high already before the brakes reach the mechanical final stop, that the closing valve 53 (compare FIG. 7) therein is closed and that when the final stop is reached the hydraulic fluid pressure quickly rises to the value limited by the overflow valve 67 of pump 13 (compare FIGS. 1 and 4). Such a value is far in excess of the value at which the discharge valve 54 in the control valve 7 opens, causing the air pressure in the braking cylinder 8 quickly to go down to atmospheric pressure. The consequences are that the re-application of the brake at the end of the wheel sensor signal will be very slow and pressurized air will be lost.

Even if the risk that the conditions described in the preceding paragraph will occur is not particularly great, measures should be taken to eliminate this risk. A simple way to obtain this result is to let the electric conductor connecting the wheel sensor and the modulator pass through a switch which is actuated by the motion in the operating mechanism of the brake. Such a switch 76 is shown in FIG. 1 to be mounted on the braking cylinder 8 and actuated by an operating means 77 attached to the push rod 9. In FIG. 1 the brake is shown in completely released condition, the push rod 9 and the brake arm 11 being moved to the right in the Figure against a stationary stop either in the braking cylinder 8 or in the brake 10. In this position switch 76 is open. As soon as the push rod 9 moves a short distance to the left in FIG. 1 during application of the brake, the contact of the operating means 77 with switch 76 is lost causing the switch to close. If the modulator under the influence of a very long-lasting wheel sensor signal tries to release the brake past the point where the brake shoes lose contact with the brake drum, the force balance in the system, apart from negligible forces from the return spring of the brake and unimportant frictional forces, only consists of the force from the hydraulic cylinder 27 and the brake cylinder 8. As a system constructed as herein described is adapted to be able, at a hydraulic fluid pressure in chamber 30 in hydraulic cylinder 27 amounting to 80 bar, to overcome the force produced by braking cylinder 8 at an air pressure of 2 bar, the air pressure in the braking cylinder 8 has been adapted by the control valve 7 to 2 bar when the brake shoes lose contact with the brake drum. From this condition the modulator continues to urge the brake towards its mechanical final stop. However the stop is never reached because the switch 76 is opened by the operating means 77 causing the wheel sensor signal to the modulator to cease and a brake application phase to start under the action of the air pressure of 2 bar isolated in the braking cylinder 8. When this brake re-application phase has brought about a movement which is sufficient to cause the operating means 77 again to close switch 76, the modulator starts again. This sequence of alternating start and stop of the modulator is repeated at a relatively high frequency and results in a quickly reciprocating movement of push rod 9, 29, brake arm 11 and details in brake 10 (not shown) until the wheel sensor signal ceases. During all this time the air pressure of 2 bar isolated in braking cylinder 8 is ready to re-apply the brake, as soon as the wheel sensor signal ceases.

When braking is not performed, the valve 60 is open and the whole circuit in the embodiment shown is maintained in an oil-filled state by gravity flow from the tank 12. The ventilation is accelerated by brake movements in a newly mounted system just filled with hydraulic fluid. For each braking action the air pressure can be found at which the brake shoes start touching the brake drum. The return spring 62 is so chosen in relation to the actuating membrane 61 that the valve cone 63 seals against the cooperating seat 64 at this pressure. During an ordinary braking while lost motion occurs, hydraulic fluid will be sucked into chamber 31 from tank 12 through valve 60. When the brake shoes reach the brake drum, the valve 60 closes the communication between tank 12 and chamber 31. During continued application of the brake the volume of chamber 31 increases. As no additional hydraulic fluid can enter into chamber 31, a negative pressure is created there causing a number of bubbles filled with vapours of light fractions of the hydraulic fluid to form. When the brake thereafter is released, the volume of chamber 31 is again reduced as well as the volume of the bubbles. When the brake shoes just come out of contact with the drum, the air pressure in the braking cylinder 8 and against membrane 61 in valve 60 has gone down to the value at which valve 60 again opens. The braking cylinder 8 pulls pressure rods 9 and 29 to stop position while hydraulic fluid is pressed back to tank 12.

If however during braking a sensor signal activates the modulator for so long time that the brakes are fully released and the modulator tries to move the brake shoes into the lost-motion range, valve 60 will not open because the air pressure in braking cylinder 8 during a braking process controlled by the braking force modulator will not come down to the required low pressure. The gas bubbles are condensed and the hydraulic fluid volume enclosed in the chamber 31, of which piston 28 constitutes one wall, blocks continued movement into the lost-motion range.

An electrical switch 78 is provided (compare FIG. 8) which is actuated by the hydraulic pressure in chamber 31 and is normally closed. The switch 78 is opened at pressures in excess of the pressure between 1 and 3 bar at which the hydraulic system constantly is pressurized. The switch 78 is inserted into the electric conductor between the wheel sensor and modulator and its function is analogous to the above-described switch 76 except that former switch 76 permits the modulator to release the brake to a point closed to its mechanical final stop whereas the presently described switch 78 only permits the modulator to release the brake a short distance outwardly into the lost-motion range.

Valve 60 does not open before the driver has released the brake pedal.

In FIG. 10 there is shown a compact embodiment of the present invention adapted to mass production manufacture and using die cast components. The unit contains all the elements shown in FIGS. 1 and 8, except those forming parts of the pressurized-air braking system itself, i.e. the compressor 1, the pressurized-air supply tank 3, the brake pedal 6, the brake valve 5, the braking cylinder 8 and the brake proper 10 with the lever 11. The only units characteristic of the invention but not to be found in FIG. 10 are cylinder 27 and valve 60. In FIG. 10 the various parts are identified by the same reference designations as corresponding parts in FIGS. 1 to 8 provided that they are not so integrated into the unit according to FIG. 10 that they cannot be identified in this outside view. It should be noted that the greater part of the conduits which in FIGS. 1 and 8 are marked by respectively broken lines (pressurized air) and dot-and-dash lines (hydraulic fluid) in the modulator according to FIG. 10 are constituted by moulded or drilled passageways. It is of course possible to integrate all the detail units according to this invention with braking cylinder 8. The embodiment shown in FIG. 10, however, is the most generic embodiment.

To conclude with, some practical construction features will be described which are characteristic of some of the elements forming part of the system and which are of great importance for the efficiency of the system.

Sealing elements such as O-rings cause very high frictional losses when used on pistons exposed to high pressures. For this reason the pistons in pump 13 (FIGS. 2 and 3) lack packings. The pistons are inserted into their cylinders with a very narrow clearance, some hundreths of a millimeter. When pump 13 is in operation, a small amount of hydraulic fluid leaks out into the eccentric space. This space is, by a drilled passageway, in communication with tank 12 to which the leaking oil is returned. The eccentric space in the casing of pump 13 is sealed against motor 26 by a very powerful sealing element 68 which is well able to resist the pressure of between 1 and 3 bar applied to the entire hydraulic system. The loss of volumetric efficiency caused by the leaking, about 10% of the pumping capacity, is considerably lower than that which would be caused by sealing elements such as O-rings on the pistons. Similarly, the pistons 55 and 58 in control valve 7 (FIG. 7) are not provided with any sealing elements to hold back the hydraulic fluid. The small amount of oil leaking past the pistons returns through bores in the casing of valve 7 to tank 12 through corresponding bores therein. This is easily arranged because, as appears from FIG. 10, control valve 7 is directly bolted to tank 12.

In contrast, O-rings 69 and 70 respectively are provided on respectively piston 58 and push rod 57. However, they are not exposed to the pressure of the hydraulic fluid which is of an order of magnitude of 80 bar. O-ring 70 is only exposed to the pressure between 1 and 3 bar with which the entire hydraulic system is charged and the same applies to O-ring 69 except when braking is performed and one side of it is exposed to the above-mentioned pressure of 1 to 3 bar whereas the other side is exposed to the air pressure supplied to braking cylinder 8 during braking.

The large hysteresis influences which otherwise would have disturbed the function of control valve 7 are thus avoided.

The construction of the pump 13 (FIGS. 2 and 3), which fundamentally is an eccentric-operated piston pump with spring-biased automatic inlet and outlet valves, is distinguished from conventional pumps of this type in one important respect. In conventional pumps the plane ends of the pistons abut an eccentric ring, the outer surface of which is completely cylindrical. If the pump only has one cylinder, the relative movement between piston and eccentric is a pure rolling motion. If the pump is provided with more than one piston, a sliding action occurs between the end planes of the pistons and the eccentric causing wear and large frictional losses, on the one hand, of the contact surfaces between the pistons and the eccentric and, on the other hand, between the pistons and the cylinders due to the large lateral or guide forces acting between the pistons and the cylinders.

These drawbacks have been completely overcome by the construction used according to the present invention. The end of pistons 72 facing the eccentric ring 71 in FIG. 2 and the outer surface of the eccentric ring provided with concave, spherical depressions having a slightly greater radius than the radius of balls 73 inserted into these depressions between the pistons and the eccentric. The sliding movement between the piston and the eccentric in this way is replaced by a pure rolling movement, and calculations confirmed by practical tests have shown that an improvement in efficiency of an order of 40% is obtained. This is one of the reasons of the previously reported very low power requirement. As for the rest, the pump is of conventional construction. The pistons are oscillated by an eccentric mechanism comprising an eccentric 74 integrated with the shaft of motor 26, a needle bearing 75, the previously mentioned eccentric ring 71 as well as balls 73. Also check valves 37, 38, 39, 40 are of conventional construction comprising coil springs, valve cones and valve seats. For the inlet valves 37, 38 flat valve cones have been chosen whereas balls have been chosen for the outlet valves. The overflow valve 67 of pump 13 is also of conventional construction, in that a seat integrated with the pump housing, a ball forming the valve cone, and a support device for supporting a spring are mounted in the pump housing.

It is to be noted that there are obviously several other types of pumps adapted to be used in connection with the present invention, such as gear pumps and wing pumps. Experience, however, has shown that piston pumps are less complicated and cheaper than other types of pumps when it is a question of small units for relatively high pressures. It will be appreciated that a piston pump having automatic, spring-biased valves has obvious advantages in connection with the way in which the complete hydraulic system is ventilated as described before. If the spring pressure of the pump valves is not too high it is easy to press oil through a piston pump which is a necessary condition for the ventilating system chosen and in which the check valve 36 forms an integrated part. In most of the other pump types, the pump must operate as a hydraulic motor in order to enable oil to be pressed through the pump which would require such high pressures that ventilating according to the principals adhered here would be impossible.

It is extremely important that solenoid valve 50 (FIG. 5) react very quickly to sensor signals both regarding attraction when current is applied to the solenoid and as regards release when the current is interrupted. As a rule, quick attraction does not offer any difficulties to attain, simply being a question of having a sufficiently powerful solenoid with many turns of windings. The difficulty in causing the core 51 to become detached when the current is broken is more pronounced and unfortunately these difficulties will be more accentuated the more powerful the magnetic flow produced by the solenoid.

Three variations of devices offering solutions for this problem shall now be explained by reference to FIG. 9 showing amperage (I) as a function of time (T). The common feature of the three arrangements is that a very powerful solenoid is used in which a very high amperage would be achieved if the chosen net voltage is permitted to act for a sufficient time. Such a process is shown by the thick full line (a) in FIG. 9.

One arrangement has a resistor in series with the solenoid valve 50. The resistor is shunted by a transistor to short circuit the resistor upon reception of a control signal. Such an arrangement may be similar to those shown, for example, in Bushnell U.S. Pat. No. 3,356,910 or Spellman U.S. Pat. No. 3,582,718. The control signal is derived from an induction coil wound on the same coil support as that forming a portion of the solenoid valve 50. When current is supplied to the solenoid valve, it initially flows through the resistor, as shown by a dot-dash line (o) to (b') in FIG. 9. A control signal is thus induced causing the transistor to conduct, shorting the resistor and permitting amperage to build up very quickly as shown by the line (b') to (b'') in FIG. 9. When the current passing through the solenoid approaches a steady state value, the time derivative of the current is so reduced that the induced control signal drops below that required to maintain the transistor conductive, so that the resistor is again inserted into the circuit. The current flow through the solenoid valve 50 is thus strongly reduced as shown by the line (b'') to (b''') to continue on a constant level. The strength of the magnetic field produced by the solenoid quickly falls to a level just sufficient to hold the core 51 in the attracted position. It will be appreciated that the core 51 will quickly return to the starting position, under the influence of the return spring, when the current supply to the solenoid is interrupted. The great advantage of this arrangement in comparison to the two arrangements to be described hereinafter is in the fact that to perform a so-called sequence control in such a way that the current flow through the solenoid 50 does not occur until the core 51 has been pulled over its entire stroke length.

Similar results can be obtained with circuits using semiconductor or "solid state" components such as commercially available integrated circuits or "chips". For example, such circuits are available which will freely pass current for a short predetermined interval of time, such as during a time indicated in FIG. 9 by the full line from (o) to (a'). After such time interval, which may be milliseconds, a "chopper" or oscillator included in the circuit interrupts the current to form a pulsating direct current having a mean voltage determined by the relation between the periods in which a circuit is respectively broken and closed. The current then goes down along the fine full line in FIG. 9 from (a') to (c'), after which the current remains at a constant level. Such a device may be incorporated as indicated at 81 in FIG. 11.

For certain fields of use of the modulator, a current limiter may be sufficient. Such a device may be incorporated as indicated at 81 in FIG. 11. In such an arrangement, current supplied to the solenoid may pass unhampered until the current approaches, at (d') in FIG. 9, a predetermined amperage after which the current is held constant at this amperage. The continued process is illustrated by the broken line (d).

It will appear from the preceding explanation that this invention has very wide applicability, particularly in connection with large vehicles. The deficiencies of prior systems have been completely eliminated by the system of the present invention, as it has been shown possible to significantly reduce the effort required of the pumping motor while at the same time substantially increasing the operating control frequency of the system as compared to prior systems. The loss of pressurized air has been significantly reduced, so that there will never be any risk that there will be insufficient air for repeated and extended use of the lock preventing system. The constructions here described are simple and readily adaptable to mass manufacture. The pronounced need for reliable lock preventing systems for vehicle brakes of the pressurized air type will thus be met by the present invention.

In the drawings and specifications there has been set forth a preferred embodiment of the invention and, although specific terms are used, the description thus given uses terminology in a generic and descriptive sense only and not for purposes of limitation.

What we claim is:

1. In an apparatus for braking a rotating member and having means for supplying pressurized air, a control valve operatively connected to said air supply means for controlling the supply of pressurized air, a pneumatic braking cylinder operatively connected to said control valve for applying braking force in response to the supply of pressurized air, a brake operatively connected to said pneumatic braking cylinder and operable between an inactive position and an active position for braking rotation of a rotating member in response to the application of braking force, sensor means for signaling the occurrence of excessive rates of retardation of the rotating member, means for supplying pressurized hydraulic fluid, counter pressure hydraulic cylinder means operatively connected with said fluid supply means and with said brake for counteracting the braking force produced by said pneumatic braking cylinder, and modulator valve means operatively connected to said sensor means and to said hydraulic cylinder means for responding to sensor signals and for modulating hydraulic fluid pressure applied to said hydraulic cylinder means and thereby for counteracting braking force applied to said brake upon occurrences of excessive rates of retardation, an improvement in the apparatus which enhances the responsiveness thereof and which comprises means operatively connected to said pneumatic braking cylinder and said modulator valve means for responding to modulated hydraulic fluid pressure indicative of a signaled occurrence of an excessive rate of retardation of the rotating member, said last named means comprising hydraulically operated closing valve means for blocking the supply of pressurized air to said braking cylinder and hydraulically operated discharge valve means for releasing pressurized air from said pneumatic braking cylinder.

2. Apparatus as claimed in claim 1 wherein said closing valve means and said discharge valve means are enclosed in a common housing to form an air pressure control valve.

3. Apparatus as claimed in claim 2 wherein said closing valve means and said discharge valve means each comprise a bore and a piston movable in the bore and actuated by modulated hydraulic pressure.

4. Apparatus as claimed in claim 1 wherein said fluid supply means comprises pump means for pumping hydraulic fluid and electrical drive motor means for driving said pump means and further wherein the apparatus comprises electrical circuit means operatively connected to said sensor means and said drive motor means for supplying electrical current to said drive motor means upon signalling of an occurrence of an excessive rate of retardation and for establishing a short circuit across said drive motor means when the sensor means interrupts current supply to the motor.

5. Apparatus as claimed in claim 1 wherein said modulator valve means comprises electrical solenoid means operatively connected for controlling the flow of pressurized hydraulic fluid and further wherein the apparatus comprises electrical circuit means operatively connected to said sensor means and said solenoid means for controlling energization of said solenoid means and including an electrical switch operatively responsive to said brake for blocking energization of said solenoid means when said brake is in said inactive position.

6. Apparatus as claimed in claim 1 wherein said modulator valve means comprises electrical solenoid means operatively connected for controlling the flow of pressurized hydraulic fluid and further wherein the apparatus comprises electrical circuit means operatively connected to said sensor means and said solenoid means for controlling energization of said solenoid means and current flow therethrough upon energization.

7. Apparatus as claimed in claim 6 wherein said electrical circuit means comprises a resistor electrically connected in series with said solenoid means and a control transistor shunting said resistor for controllably short-circuiting said resistor, said transistor being electrically connected for receiving a control current from an induction loop wound in common with said solenoid means.

8. Apparatus as claimed in claim 6 wherein said electrical circuit means comprises timing means electrically connected in series with said solenoid means and effective after a predetermined time interval of conductance for converting current through said solenoid means into a pulsating direct current having a mean voltage which limits the amperage through said solenoid means to a predetermined value.

9. Apparatus as claimed in claim 6 wherein said electrical circuit means comprises current limiting means electrically connected in series with said solenoid means and effective, after a certain predetermined amperage has been achieved, to limit any increase in current.

10. In an apparatus for braking a rotating member and having means for supplying pressurized air, a control valve operatively connected to said air supply means for controlling the supply of pressurized air, a pneumatic braking cylinder operatively connected to said control valve for applying braking force in response to the supply of pressurized air, a brake operatively connected to said pneumatic braking cylinder and operable between an inactive position and an active position for braking rotation of a rotating member in response to the application of braking force, sensor means for signalling the occurrence of excessive rates of retardation of the rotating member, means for supplying pressurized hydraulic fluid, fluid filled counter pressure hydraulic cylinder means operatively connected with said fluid supply means and with said brake for counteracting the braking force produced by said pneumatic braking cylinder and having a piston movable within said hydraulic cylinder means and defining therewith a counter pressure chamber and a balancing chamber, and modulator valve means operatively connected to said sensor means and to said hydraulic cylinder means for responding to sensor signals and for modulating hydraulic fluid pressure applied to said counter pressure chamber and thereby for counteracting braking force applied to said brake upon occurrences of excessive rates of retardation, an improvement in the apparatus which enhances the responsiveness thereof and which comprises means operatively connected to said pneumatic braking cylinder and said modulator valve means for responding to a signaled occurrence of a continued excessive rate of retardation of the rotating member, said last named means comprising pneumatically operated closing valve means for blocking fluid flow from said balancing chamber and thereby locking said piston against movement.

11. Apparatus as claimed in claim 10 wherein said modulator valve means comprises electrical solenoid means operatively connected for controlling the flow of pressurized hydraulic fluid and further wherein the apparatus comprises electrical circuit means operatively connected to said sensor means and said solenoid means for controlling energization of said solenoid means and including a switch actuated by the pressure in said balancing chamber of said hydraulic pressure cylinder and electrically interposed between said sensor means and said modulator valve means, said switch being closed at the hydraulic fluid pressure normally held by the system and opened upon the occurrence of excessive pressures therein.

12. Apparatus as claimed in one of claims 1 or 10 wherein the means for supplying pressurized hydraulic fluid comprises a multi-cylinder piston pump having pistons and an oscillating common eccentric for driving said pistons, and wherein said eccentric and the ends of said pistons facing the eccentric have spherical depressions, the pump having a ball with a radius less than the radius of the spherical depressions placed in the spherical depressions between each piston and the eccentric.

13. Apparatus as claimed in claim 12 further comprising hydraulic fluid pressurizing means for applying a base pressure to said hydraulic fluid supply means, said hydraulic pressure cylinder means and said modulator valve means in order to avoid cavitation at said pump and to pressurize hydraulic fluid throughout a hydraulic circuit including said hydraulic pressure cylinder means and said modulator valve means, said circuit further comprising a reservoir, a return conduit for returning a flow of hydraulic fluid, and a check valve inserted into the return conduit so that the entire hydraulic circuit is automatically ventilated.

14. Apparatus as claimed in one of claims 1 or 10 wherein said modulator valve further comprises means for controlling the rate of decrease of hydraulic pressure applied to said hydraulic cylinder means and thereby for controlling the rate of re-application of braking force applied to said brake following cessation of an excessive rate of retardation.

15. In a method of avoiding locking of a rotating member braked by force generated by supplying pressurized air to a pneumatically actuated wheel cylinder and transmitted through a mechanical linkage directly from the cylinder to a brake and which includes sensing occurrence of a rate of retardation of the rotating member which exceeds a predetermined rate indicative of a tendency of the rotating member to lock, normally accommodating free flow of hydraulic fluid to and from a counter pressure hydraulic cylinder, and responding to a sensed occurrence of an excessive rate of retardation of the rotating member by blocking flow of hydraulic fluid from the hydraulic cylinder and pumping hydraulic fluid to the hydraulic cylinder for generating a relieving force acting on the mechanical linkage and opposing the braking force transmitted therethrough, an improvement which enhances the responsiveness of the system and which comprises the step of responding to an increase in the pressure of the hydraulic fluid supplied to the hydraulic cylinder by blocking the supply of pressurized air to the braking cylinder and releasing pressurized air therefrom.

16. In a method of avoiding locking of a rotating member braked by force generated by supplying pressurized air to a pneumatically actuated wheel cylinder and transmitted through a mechanical linkage directly from the cylinder to a brake and which includes sensing occurrence of a rate of retardation of the rotating member which exceeds a predetermined rate indicative of a tendency of the rotating member to lock, normally accommodating free flow of hydraulic fluid to and from a counter pressure hydraulic cylinder having a piston therewithin which defines a counter pressure chamber and a balancing chamber, and responding to a sensed occurrence of an excessive rate of retardation of the rotating member by blocking flow of hydraulic fluid from the hydraulic cylinder and pumping hydraulic fluid to counter pressure chamber of the hydraulic cylinder for generating a relieving force acting on the mechanical linkage and opposing the braking force transmitted therethrough, an improvement which enhances the responsiveness of the system and which comprises the step of responding to the pressure of pressurized air supplied to the wheel cylinder by blocking the flow of hydraulic fluid from the balancing chamber and thereby locking the piston of the hydraulic cylinder against movement.

* * * * *